United States Patent [19]

Butcher

[11] Patent Number: 4,625,320

[45] Date of Patent: Nov. 25, 1986

[54] AUTOMATIC BIAS CIRCUIT

[75] Inventor: James S. Butcher, Glendale, Ariz.

[73] Assignee: Motorola, Inc., Schaumburg, Ill.

[21] Appl. No.: 728,960

[22] Filed: Apr. 30, 1985

[51] Int. Cl.⁴ ............................................. H04L 25/06
[52] U.S. Cl. ..................................... 375/76; 307/264;
307/359; 328/164
[58] Field of Search ................. 375/76, 110; 330/137;
358/171; 307/234, 264, 359; 328/164

[56] References Cited

U.S. PATENT DOCUMENTS

| | | |
|---|---|---|
| 3,359,410 | 12/1967 | Frisby et al. . |
| 3,514,702 | 5/1970 | Nahay et al. . |
| 3,548,296 | 12/1970 | Sundström ........................... 307/264 |
| 3,775,692 | 11/1973 | Azegami .............................. 328/164 |
| 3,838,448 | 9/1974 | Garde et al. . |
| 3,846,710 | 11/1974 | Chapman . |
| 4,029,904 | 6/1977 | Papeschi . |
| 4,070,591 | 1/1978 | Butcher ............................... 307/359 |
| 4,097,860 | 6/1978 | Araseki et al. ....................... 307/359 |
| 4,125,812 | 11/1978 | Polonio . |
| 4,140,874 | 2/1979 | Thomas ................................. 375/76 |
| 4,161,628 | 7/1979 | McRae ................................... 375/76 |
| 4,175,256 | 11/1979 | Dolikian . |
| 4,250,458 | 2/1981 | Richmond et al. .................... 375/76 |
| 4,270,208 | 5/1981 | MacDavid ............................ 375/76 |
| 4,307,465 | 12/1981 | Geller . |
| 4,352,030 | 9/1982 | Beesley . |
| 4,352,193 | 9/1982 | Acker . |
| 4,367,441 | 1/1983 | Niyada et al. ........................ 328/164 |
| 4,400,817 | 8/1983 | Sumner . |
| 4,406,988 | 9/1983 | Scholz ................................. 328/164 |
| 4,449,102 | 5/1984 | Frazer ................................. 328/164 |
| 4,481,670 | 11/1984 | Freeburg . |

FOREIGN PATENT DOCUMENTS 2905903 2/1979 Fed. Rep. of Germany .

OTHER PUBLICATIONS

Transmissions Systems for Communications; Bell Telephone Laboratories, Dec. 1971, pp. 655 & 656.

*Primary Examiner*—Marc E. Bookbinder
*Attorney, Agent, or Firm*—Raymond A. Jenski; Rolland R. Hackbart

[57] ABSTRACT

An automatic bias control circuit for a data limiter in a synchronous data communications system is disclosed. After word synchronization is achieved, the automatic bias control circuit is enabled and a time relationship between the limited data signal edges and a synchronized local clock signal is detected. The automatically controlled bias level is then modified upward or downward by an additive or subtractive voltage increment for a period of time related to the data bit rate so that the true baseline of the data signal is approximated by the bias level and the detected time relationship is thereby adjusted so that the edges are essentially synchronized with the local clock signal.

18 Claims, 13 Drawing Figures

Fig. 1

PRIOR ART

Fig. 2

PRIOR ART

| EDGE COUNT | OE PULSE WIDTH X 8 X PERIOD | dV BIAS CORRECT (MV) |
|---|---|---|
| 0,1 | 1 | 16 |
| 2,3 | 7/8 | 14 |
| 4,5 | 3/4 | 12 |
| 6,7 | 5/8 | 10 |
| 8,9 | 1/2 | 8 |
| 10,11 | 3/8 | 6 |
| 12,13 | 1/4 | 4 |
| 14,15 | 1/8 | 2 |

AUTOMATIC BIAS CIRCUIT

BACKGROUND OF THE INVENTION

This invention relates generally to automatic bias circuits and more specifically to baseline wander compensation circuits for alternating current (AC) coupled signal limiters for synchronous baseband data detectors. Radio data communication systems, in particular, may make use of the present invention to further compensate direct current (DC) offset voltages which result from differences in the frequencies of transmission and reception.

Portable and mobile radio transceivers are commonly used for communications of data messages. These data transceivers can be found in paging systems and two-way communications systems such as those used by the public and government agencies. Recently, portable radio transceivers have found use in portable data terminals which may be used to communicate with a host computer via radio or wireline.

Most devices which are used for radio data communications are operated in a synchronous mode. That is, the local clock signal used to operate the radio data terminal data decoding is phase compensated so that the transitions of the local clock signal are aligned with the transitions of the incoming data signal.

Several well known techniques have been developed for synchronizing a local clock to a received data signal. One common technique advances or retards the local clock signal by adding pulses from a signal coupled to a frequency divider chain which provides a local signal. Another technique for clock recovery utilizes a programmable divider coupled to a reference clock signal. The recovered clock signal is compared to the received data signal and the divider is programmably altered to shift the phase of the recovered clock. This latter technique for phase adjustments is described in U.S. Pat. No. 4,400,817 assigned to the assignee of the present invention.

To avoid the relatively large amount of time to acquire a clock signal in the presence of data bias distortion and phase ambiguities occuring in the limiter and discriminator stages of a frequency modulation receiver commonly used in the aforementioned applications, an automatic clock recovery circuit was invented and disclosed in U.S. patent application No. 564,975, now U.S. Pat. No. 4,575,863, filed in behalf of Butcher on Dec. 22, 1983 and assigned to the assignee of the present invention. The automatic clock recovery circuit disclosed therein advances or retards the phase of a recovered clock signal depending upon the relative phase of the received data signal and recovered clock signal. It also disables the retard correction immediately following advance correction and disables the advance correction based on certain phase conditions between the received data signal and the recovered clock signal.

To process and detect the received data signal, the signal is coupled to a data signal limiter circuit, which regenerates squared-up waveforms with steep rising and falling edges to provide binary "1" and "0" information to a data decoder. However, a difference in the operational frequencies of the receiver and transmitter in a radio system causes an offset DC voltage to be superimposed on the received signal. Additionally, AC coupling of the received signal may result in an offset voltage being added to the received signal, particularly when the signal consists of a long consecutive string of digital "1's" or "0's". These aforementioned offsets, which may change over time, constitute a wander of the data baseline and complicate the detection and decoding process.

Solutions to this wander have generally included peak-to-peak detection of the data signal and subsequent generation of a baseline signal equal to ½ the detected peak-to-peak voltage such as described in U.S. Pat. Nos. 3,846,710 and 4,175,256 assigned to the assignee of the present invention. In those data systems employing synchronous data decoding, the data signal peak-to-peak average detection may operate too slowly to establish a baseline to enable detection of a synchronizing signal.

The invention disclosed in U.S. patent application No. 564,974, now U.S. Pat. No. 4,575,863, filed in behalf of Butcher, et al., on Dec. 22, 1983 and assigned to the assignee of the present invention, addresses the timing problem of synchronization detection by incorporating a dual time constant bias recovery circuit into the transceiver. A short time constant is used during the period when a data message synchronization is being received and is programmably switched to a long time constant for the duration of the synchronized data message. However, since the dual time constant recovery circuit follows the average DC component of the data signal, long unbalanced data messages with AC coupling may result in improper baseline determination.

SUMMARY OF THE INVENTION

Therefore, it is an object of the present invention to provide an automatic bias circuit for data detection in which compensation for baseline wander due to receive-transmit frequency offsets and AC coupling is accomplished.

It is a further object of the present invention to provide a bias having a signal-averaging characteristic during synchronization detection and an automatic bias characteristic for message data.

It is a further object of the present invention to provide an automatically adjusted bias dependent upon the relationship of the received data bit edge transitions and the clock edge transitions.

Accordingly, these and other objects are achieved in the present invention of an automatic bias circuit.

This circuit automatically corrects the bias of a synchronous data detector such that the true baseline of the data may be approximated. Correction is achieved by producing binary data levels and rapid level transition edges corresponding to input data and referenced to the bias level. Local clock signals are generated and a time relationship is detected between at least one of the clock signals and the transition edges. The bias level is then modified in accordance with the detected time relationship such that the edges become synchronized with the local clock signals.

DETAILED DESCRIPTION OF THE PREFERRED EMBODIMENT

Figure 1:
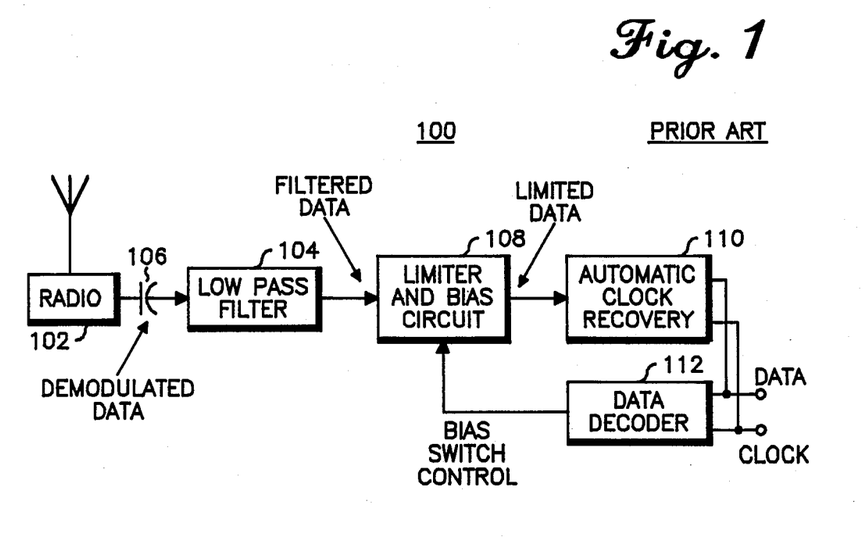
FIG. 1 is a block diagram of a digital data receiver known in the art which may be used in accordance with the present invention.

FIG. 1 is a block diagram of a digital data receiver of the type known in the art which may be modified to utilize the present invention. A typical digital data receiver 100 comprises a conventional RF radio receiver 102 which provides an output signal comprising demodulated data. The lowpass filter 104 filters the demodulated data which is coupled from the radio 102 via capacitor 106 thereby creating filtered data which has high frequency noise removed and which is AC coupled from the radio receiver 102. The filtered data is processed by a limiter and bias circuit 108 to provide binary "1" and "0" information and to reduce transition jitter in the filtered data signal. The processed filtered data signal, referred to as limited data, is coupled to an automatic clock recovery circuit 110 which samples the incoming data and recovers a timing clock signal from the limited data signal. The output from the automatic clock recovery 110 is coupled to data decoder 112 where the data signal is continuously monitored for a coded message. Data decoder 112 may be of the type described in U.S. Pat. No. 4,481,670 and assigned to the assignee of the present invention. The data decoder 112 described in the above-mentioned reference utilizes a microprocessor which operates under the control of a stored program and several subroutines which are further described in U.S. patent application No. 564,974, now U.S. Pat. No. 4,575,863, filed in behalf of Butcher et al., on Dec. 22, 1983 and assigned to the assignee of the present invention.

The coded digital message is preceded by a specific binary pattern called word synchronization (sync) which indicates the beginning of a message or message group and is used to align the transitions of the receiver local clock to the transitions of a received data signal. A suitable coded data signal and signalling format for use in the present invention is described in U.S. patent application No. 402,682, now U.S. Pat. No. 4,590,473, filed in Burke et al. on July 28, 1982 and assigned to the assignee of the present invention. One possible output from data decoder 112 is an indication of the detection of the sync signal which may be used to control the bias in limiter and bias circuit 108. This output is labelled bias switch control in FIG. 1.

Figure 2:
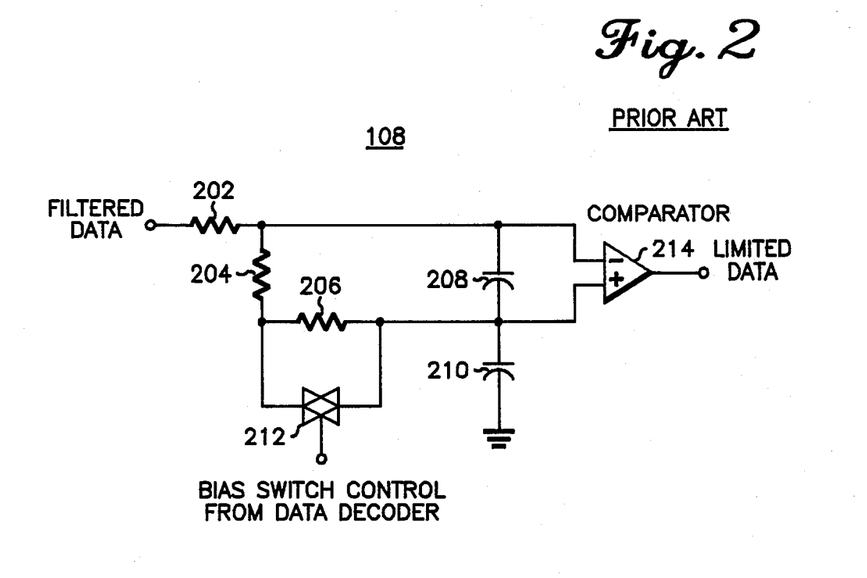
FIG. 2 is a schematic diagram of a previously disclosed bias circuit employing a dual time constant bias.
Figure 3:
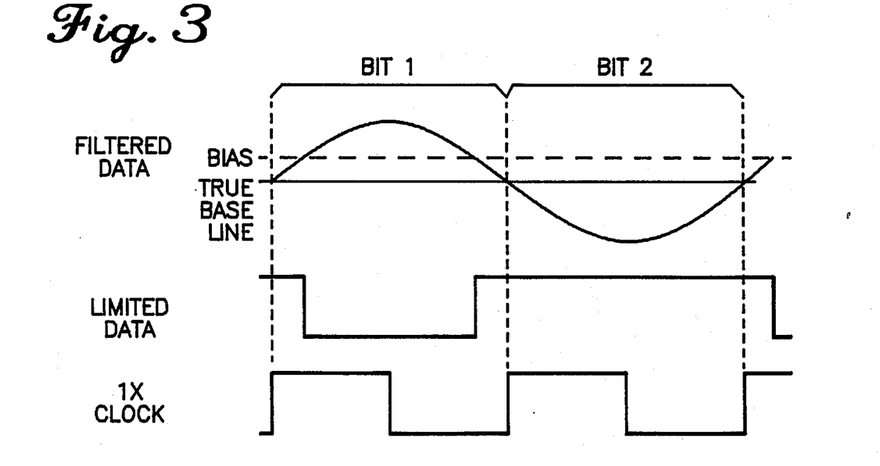
FIG. 3 is a timing diagram showing the relationship between the 1X clock, the limited data, and the filtered data for which the bias exceeds the true baseline.
Figure 4:
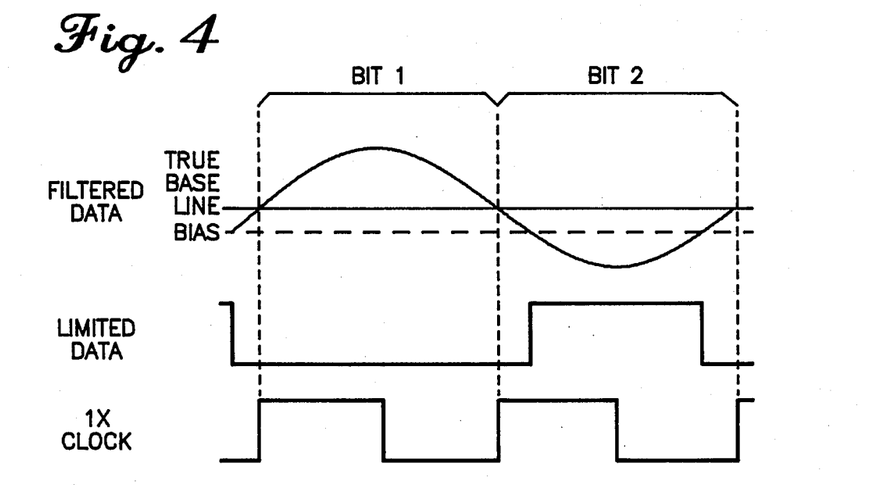
FIG. 4 is a timing diagram showing the relationship between the 1X clock, the limited data, and the filtered data for which the bias is less than the true baseline.

The limiter and bias circuit is shown in more detail in the schematic of FIG. 2. The bias in this implementation is used to approximate the baseline voltage of the filtered data signal. A problem arises in the decoding of data if the bias is improperly set in limiter and bias circuit 108. The effect of improper bias can be seen from FIGS. 3 and 4. Two data bits are shown in FIG. 3 and the waveforms corresponding to the two data bits at the points labelled filtered data and limited data in FIG. 1. The local clock is shown in corresponding time relation to the two data bits. In FIG. 3, the bias is improperly set to a value above the true baseline. Rather than producing a limited data waveform which corresponds to clock transitions in time, as would occur if the bias were set to the true baseline, a bias level set above the true baseline produces a limited data waveform having a shortened "low" data level and a lengthened "high" data level. Likewise, a bias level improperly set below the true baseband yields a data "low" limited data waveform of extended time duration and a limited data "high" waveform of shortened time duration as shown in FIG. 4. Thus, it is necessary to detect that the bias has been improperly set and to reduce the bias when it is above the true baseline and to increase the bias when it is below the true baseline.

One form of a fast recovery bias circuit tor limiter and bias circuit 108 is shown in FIG. 2. The fast recovery bias circuit 108 comprises resistors 202, 204, and 206; capacitors 208 and 210; switch 212; and comparator 214. The combination of resistors 202 and 204 and capacitor 210 form a lowpass filter with a corner frequency of approximately 50 Hz when switch 212 is activated. Capacitor 210 rapidly charges to the average voltage of the received data signal and sets the voltage at the voltage reference input of comparator 214. Comparator 214 processes the filtered data signal to provide binary "1" and "0" information to the automatic clock recovery circuit 110 and data decoder 112. Capacitor 208 suppresses high frequency noise at the comparator input. If a sync pattern is detected by the data decoder 112 of FIG. 1, the bias switch control signal deactivates the switch 212 which reduces the corner frequency of the lowpass filter and helps compensate bias voltage variations which occur due to a long string of "1's" and "0's" in a digital message.

Thus, before sync is detected, the short time constant of the prior art bias circuit responds to the rapid variations in the DC offset voltage of the filtered data signal. This enables proper limiter biasing in the presence of transmit-receive frequency offsets. After sync has been detected, the long time constant bias circuit is switched in. In many instances, however, even a long time constant bias circuit will allow the baseline to wander above or below the true baseline when a long series of consecutive "1's" or "0's" occurs in the data message.

The invention of the present application solves this problem by dynamically and automatically adjusting the bias as described hereinafter, rather than relying on a long time constant to carry the bias through a long string of "1's" or "0's". The present invention causes the automatic bias control circuit to be switched in after synchronization has been detected. This novel automatic bias control circuit tracks the decay voltage of an AC coupling capacitor (such as capacitor 106 in FIG. 1) due to an initial DC offset voltage and also tracks the baseline wander of the AC coupled demodulated data signal.

The automatic bias control circuit senses where the positive and negative data transitions occur with respect to the local clock (hereinafter referred to as the 1X signal). Referring again to FIGS. 3 and 4, if a positive limited data edge occurs while 1X is high or a negative going data edge occurs while 1X is low (FIG. 4), the bias is increased. If a negative going data edge occurs while the 1X signal is high or a positive going data edge occurs while the 1X signal is low (FIG. 3), the bias is decreased. This adjustment of bias forces the limited data bias distortion to average near zero.

Figure 5:
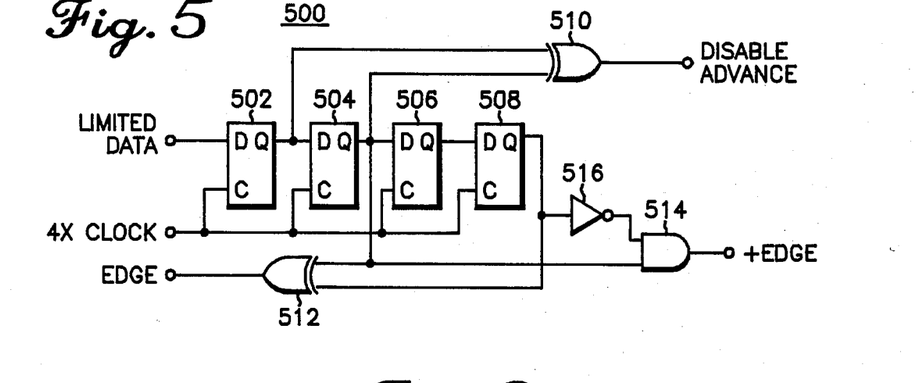
FIG. 5 is a schematic of the data sampler portion of the automatic clock recovery circuit employed in the present invention.
Figure 6:
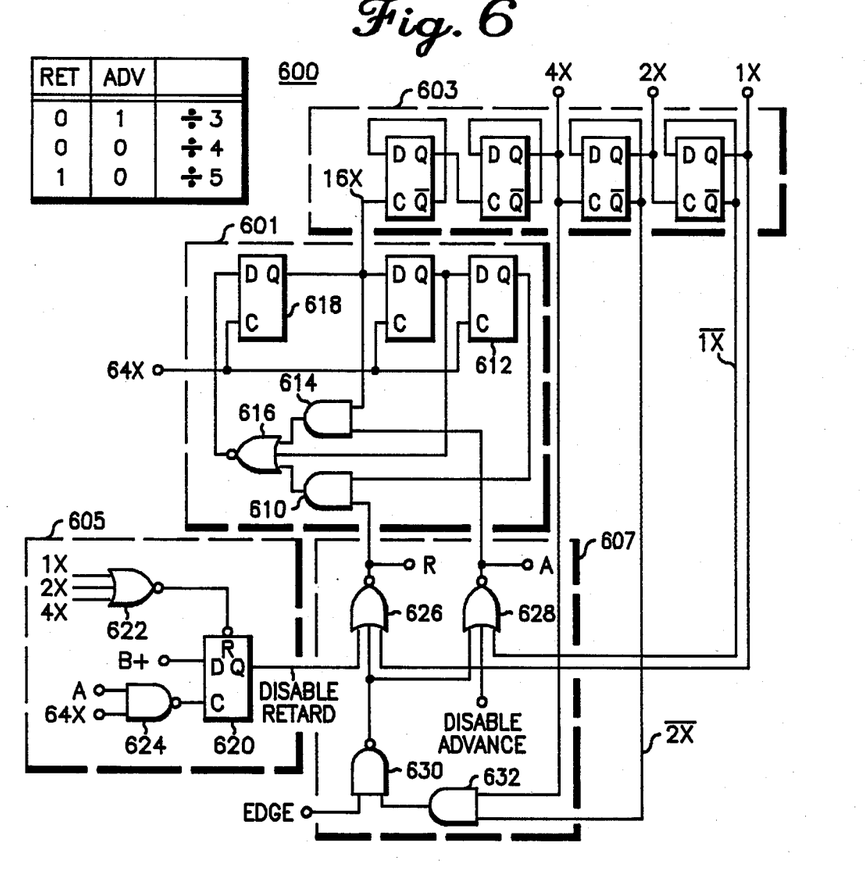
FIG. 6 is a schematic of the clock adjust circuitry of the automatic clock recovery circuit employed in the present invention.

To allow the automatic bias control circuit ot the present invention to operate, the local clock must be synchronized to the demodulated data even though the edges of the data bits of the demodulated data may wander as the baseline wanders. A similar clock synchronization circuit is described in U.S. patent application No. 564,975, now U.S. Pat. No. 4,575,863, in behalf of Butcher on Dec. 22, 1983 and assigned to the assignee of the present invention. The improved clock synchronization circuit employed in the present invention is shown in FIGS. 5 and 6 and operates as follows: Limited data is coupled to the input of an improved automatic clock recovery circuit which, as shown in the data sampler 500 FIG. 5, is the "D" terminal of flip-flop 502. Flip-flops 502, 504, 506, and 508 form a four stage shift register which is clocked at four times the demodulated data rate with a 4X clock signal coupled to the C terminal of each flip-flop. Exclusive-OR gate 510 compares the outputs of flip-flops 502 and 504 and provides a disable advance signal, which will be described later. Exclusive-OR gate 512 compares the outputs of flip-flops 504 and 508 and provides an EDGE signal indicating the transitions of the limited data (and lasting one 4X clock cycle). A +EDGE signal is also developed from the outputs of flip-flop 504 and flip-flop 508 by ANDing the output of flip-flop 504 in AND gate 514 with the inverted output of flip-flop 508 (via inverter 516). The EDGE signal provides an indication at every transition of the limited data signal and the +EDGE signal provides an indication of only the positive-going limited data signal transition.

Referring now to FIG. 6, the logic required to implement the clock adjust circuitry 600 is shown in a detailed schematic. This clock adjust circuitry includes a programmable frequency divider 601, a multiple tap frequency divider 603, a disable retard generator 605, and a control circuit 607. Reference timing is provided by a conventional locally generated 64X clock.

The programmable divider circuit 601 adjusts the phase of the recovered clock signal by programmably switching a plurality of divide ratios, as instructed by the control circuit 607. If no phase correction is required, the programmable divider provides an output signal at ¼th the frequency of a 64X reference clock. The multiple tap frequency divider 603 is coupled to the programmable frequency divider output and provides (via a conventional D-Q flip-flop arrangement) output signals comprising the 1X recovered clock signal, a 2X, a 4X, and 8X clock signal. The 4X clock signal is used to operate the 4X sample clock of FIG. 5.

The programmable divider 601 can be switched between divide ratios of 3, 4, or 5 as determined by the control signals advance, A, or retard, R, shown in FIG. 6. The AND gate 610 is coupled to the retard control signal and the output of flip-flop 612. The AND gate 614 is coupled to the advance control signal and the 16X output of the programmable divider circuit. The NOR gate 616 combines the outputs of AND gates 610 and 614 and controls the data input to flip-flop 618. Therefore, if the phase of the recovered clock signal should be advanced to be synchronized with the limited data, the programmable divider is set to divide by 3 as shown in the table. If the phase of the recovered clock signal should be retarded, the programmable divider is set to divide by 5.

The disable retard generator circuit 605 is formed by flip-flop 620, NOR gate 622, and NAND gate 624. The disable retard circuit generates an output signal whenever an advance signal has occurred. Flip-flop 620 maintains the disabled retard signal until being reset by NOR gate 622 which is activated after every recovered clock signal. Whenever flip-flop 620 has been set, the output of NOR gate 626 is inhibited and no clock retard can occur.

The control circuit 607 generates the retard advance control signals used to control the programmable divider 601. NOR gates 626 and 628 are coupled to the 1X and the $\overline{1X}$ clock signal, respectively. NAND gate 630 combines the edge signal output from Exclusive-OR 512 in FIG. 5 with the 4X and $\overline{2X}$ output of AND gate 632. The output of NAND gate 630 is applied to NOR gates 626 and 628 to allow clock corrections to be made only when its output is low.

The correction control logic generates the proper retard and advance signals based on EDGE, disable retard, disable advance, and the 1X, $\overline{1X}$, $\overline{2X}$, and 4X clock signals. If an EDGE signal occurs when 1X, $\overline{2X}$ and 4X are high, the advance output of NOR gate 628 goes high unless the disabled advance signal input to NOR gate 628 is high. If a EDGE signal occurs when 1X is low and $\overline{2X}$ and 4X are high, the retard output of NOR gate 626 goes high unless the disabled retard output of flip-flop 620 is high. An advance or retard correction can occur only while $\overline{2X}$ and 4X are high, which is a period of two 16X clock cycles. This produces a phase correction of 1/32 of the 1X clock.

Thus, the improved automatic clock recovery circuit samples a limited data signal and advances or retards the sample clock to align the transitions of the received data signal with the transitions of a local clock signal. This automatic clock recovery circuit provides additional clock signals and improved acquisition time in the presence of limiter bias distortion.

Figures 7, 13:
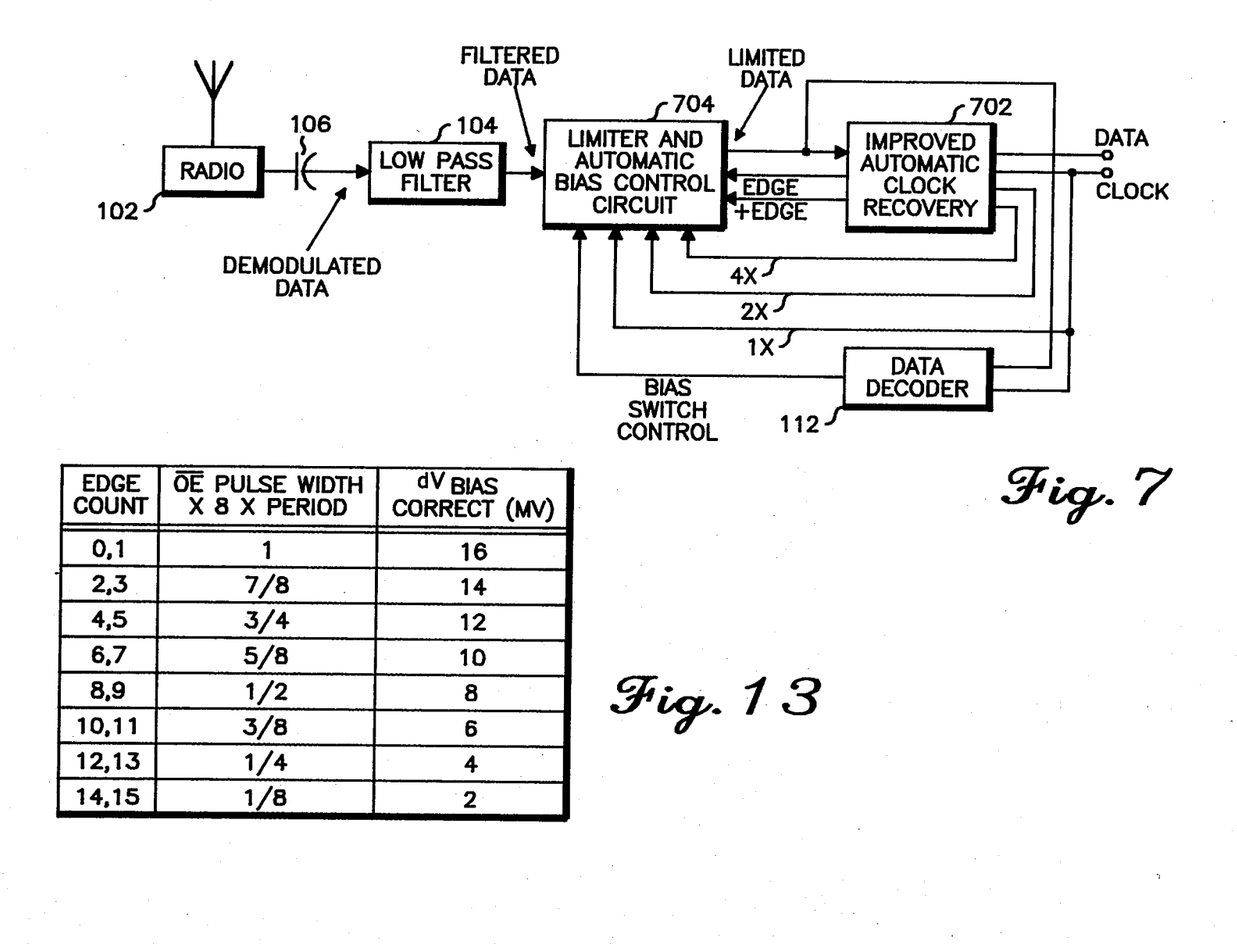
FIG. 7 is a block diagram of a digital data receiver similar to that of FIG. 1 in which the logic signal line interconnection of the present invention are shown.
FIG. 13 is a table showing the relationship of the edge count, pulse width, and bias correction voltage for the edge history correction circuit of FIG. 12.

Referring to FIG. 7, the improved automatic clock recovery circuit 702 (which includes data sampler 500 and clock adjust circuitry 600) is coupled to a limiter and automatic bias control circuit 704 to yield the improved synchronous data limiter and decoder circuit of the present invention. In the present invention, detection of word sync by data decoder 112 (signalling the beginning of a message) changes the bias switch control line from high to low and causes the limiter bias circuit to be switched from a fast recovery bias to the automatic bias control circuit 704. As before, the bias switch control line remains low for the duration of the message and then returns to high to indicate an idle state.

Figure 8:
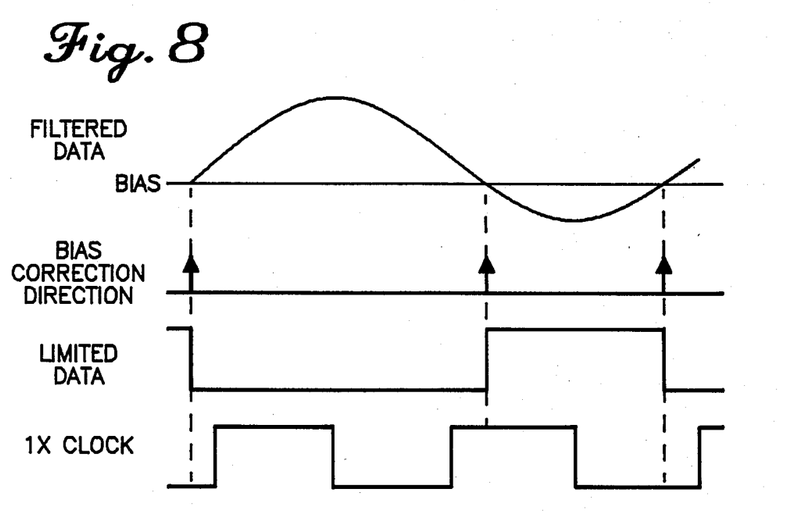
FIG. 8 is a timing diagram showing the bias correction direction for a bias below the true baseline.
Figure 9:
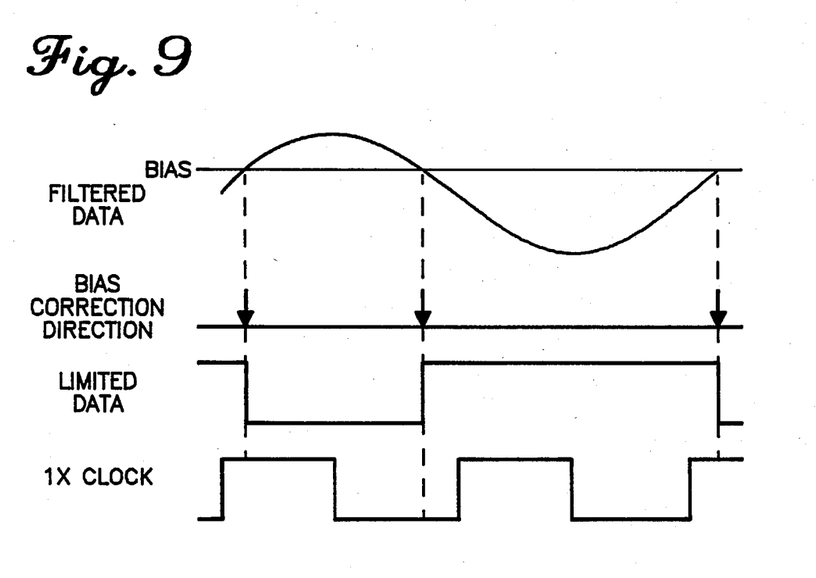
FIG. 9 is a timing diagram showing the bias correction direction for a bias above the true baseline.

The automatic bias control circuit 704 senses where the positive and negative data transitions occur with respect to the 1X clock recovered by the improved automatic clock recovery circuit 702. If, as shown in FIG. 8, a positive data edge occurs while the 1X signal is high or a negative edge occurs while the 1X signal is low (indicative of a limiter bias which is set too low), the bias is increased in the direction shown by a fixed voltage step (dV). If, as shown in FIG. 9, a negative data edge occurs while the 1X signal is high or a positive data edge occurs while the 1X signal is low (indicative of a limiter bias which is set too high), the bias is reduced in the direction shown by the same fixed voltage step. The automatic bias control circuit 704 makes one fixed voltage step correction for each data edge. The minimum magnitude of the fixed voltage step is constrained by system considerations such that the bias circuit can satisfactorily track the baseline wander which occurs with the minimum frequency of data edges and the maximum peak-to-peak amplitude of the filtered data. The maximum magnitude of the fixed voltage step is limited to the maximum tolerable transition jitter which occurs with the maximum frequency of data edges and the minimum peak-to-peak amplitude of filtered data.

Figure 10:
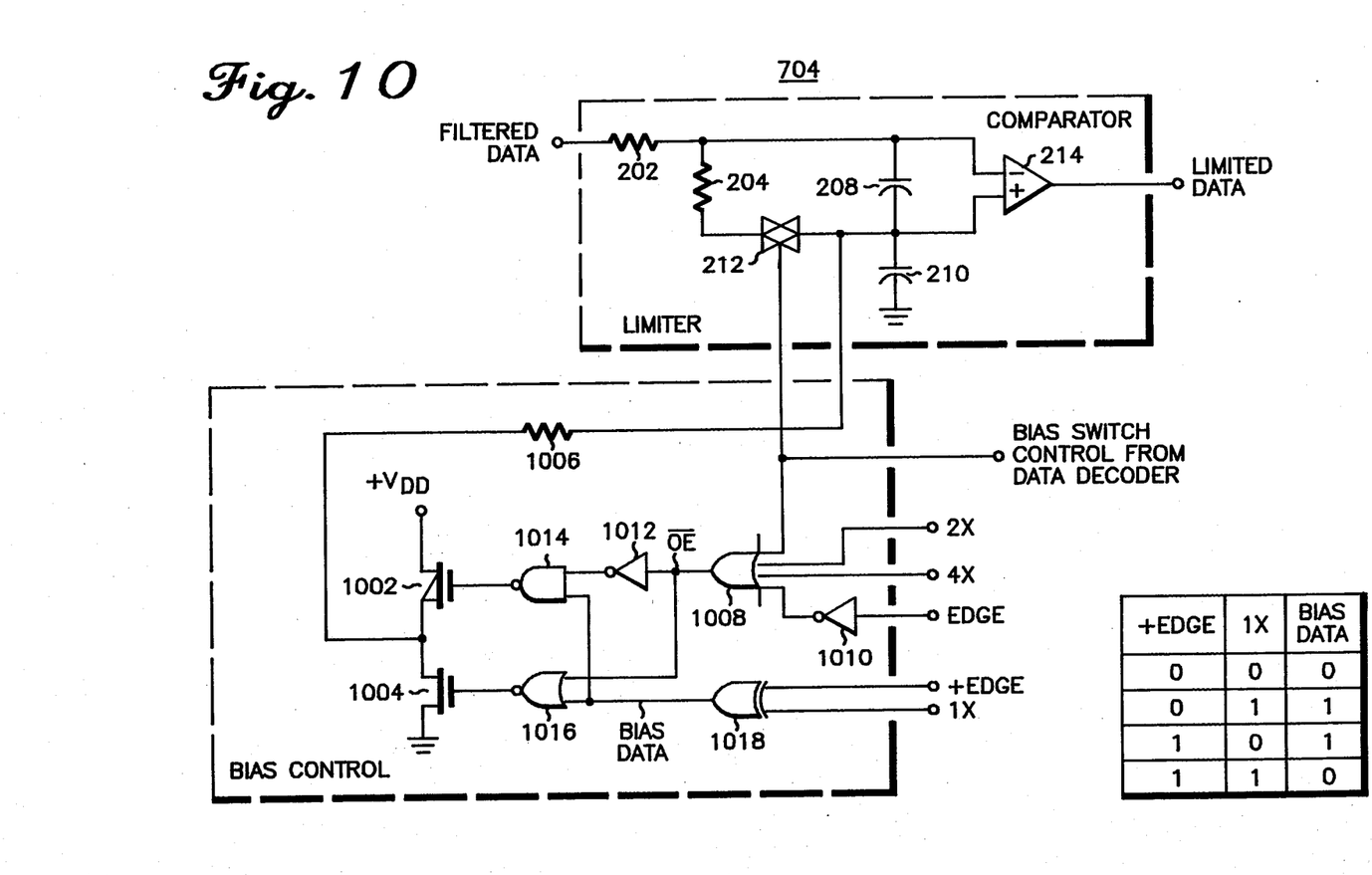
FIG. 10 is a schematic diagram of the limiter and bias correction circuit of the present invention.

FIG. 10 shows a detailed schematic diagram for the limiter and automatic bias control circuit 704. The voltage developed across capacitor 210 is the bias voltage reference for the positive input of the comparator 214. If the filtered data voltage appearing on the negative input of the comparator is below or above the bias reference, the limited data output will be high or low, respectively as shown in previous FIGS. 8 and 9. Capacitor 208, which in the preferred embodiment is between 50 and 100 picofarads, supresses high frequency noise at the comparator input.

Before word synchronization is detected, the bias switch control line is high and the analog switch 212 is on. The transistors 1002 and 1004 (which in the preferred embodiment are a conventional PMOS transistor and NMOS transistor) are forced off since an $\overline{OE}$ signal (output enabled) is high due to the bias switch control signal, regardless of the state of the 4X, 2X, 1X, EDGE, or +EDGE lines from the automatic clock recovery circuit 702. With these conditions, capacitor 210 quickly charges to the average voltage of the filtered data signal through resistors 202 and 204. Since transistor 1002 and transistor 1004 are both off, current flow through resistor 1006 is inhibited and thus there is no effect on the RC time constant at the positive input of comparator 214.

After word synchronization is detected, the bias switch control line goes low, the analog switch 212 turns off, and the state of the $\overline{OE}$ line is determined by the 4X, 2X, and EDGE signals input to the other 3 inputs of OR gate 1008. Before a data edge occurs, the EDGE line is low, forcing $\overline{OE}$ high via EDGE signal inverter 1010, which provides a high input to OR gate 1008. The $\overline{OE}$ signal is coupled to transistor 1002 via inverter 1012 and NAND gate 1014, thereby providing an output to transistor 1002 dependent upon the state of $\overline{OE}$ line and the bias data line. The $\overline{OE}$ signal is coupled to transistor 1004 via NOR gate 1016 which provides an output depending upon either $\overline{OE}$ or bias data. When a data edge occurs (EDGE=high) and 4X and 2X are both low, $\overline{OE}$ goes low. This enables the bias data line to control whether transistor 1002 or 1004 are on. If the bias data line is high, transistor 1002 turns on because two high inputs are applied to NAND gate 1014. When transistor 1002 is on, positive supply ($V_{DD}$) is applied to resistor 1006. If the bias data line is low, transistor 1004 turns on because both $\overline{OE}$ and bias data are low when applied to NOR gate 1016. An on transistor 1004 applies ground potential to resistor 1006. Thus, the capacitor 210 is either further charged toward $V_{DD}$ via resistor 1006 and transistor 1002 or discharged via resistor 1006 and transistor 1004. (Transistor 1002 and 1004, due to the logic shown, are never both on at the same time).

The state of the bias data line is determined by the Exclusive-OR function 1018 which accepts inputs from the +EDGE and 1X lines (see table). If the +EDGE line is high, a positive edge is indicated from the limited data. For the case where a positive edge occurs while 1X is high, the bias data line will be low resulting in transistor 1004 being on. Transistor 1004 remains on for ¼th of a bit period (the period while 4X is low at the input of OR gate 1008). Capacitor 210 is discharged through transistor 1006 and transistor 1004 during this ¼th bit period. Thus, a fixed voltage bias correction equal to the RC time constant voltage change during a ¼th bit period of time (equal to dV) is used to reduce the limiter bias by the fixed amount dV. When the 4X signal returns high, $\overline{OE}$ goes high and transistor 1004 turns off. Capacitor 210 holds the remaining charge and maintains a constant bias voltage until the next ¼th bit period bias correction occurs. To maintain a constant average DC bias with data edges present, alternate up-down bias corrections may occur.

In the preferred embodiment, where a 4800 BPS baseband data rate is expected, the bias circuit RC time constant is realized with component values of capacitor 210 being 0.1 microfarad and resistor 1006 being 100K ohms. This produces a dV bias correction of 6.5 mV for a supply voltage ($V_{DD}$) equal to 5 V, which is appropriate for a nominal 1 V peak-to-peak filtered data level. Other component values and data rates may be chosen by a person skilled in the art without departing from the spirit and scope of the present invention.

Figure 11:
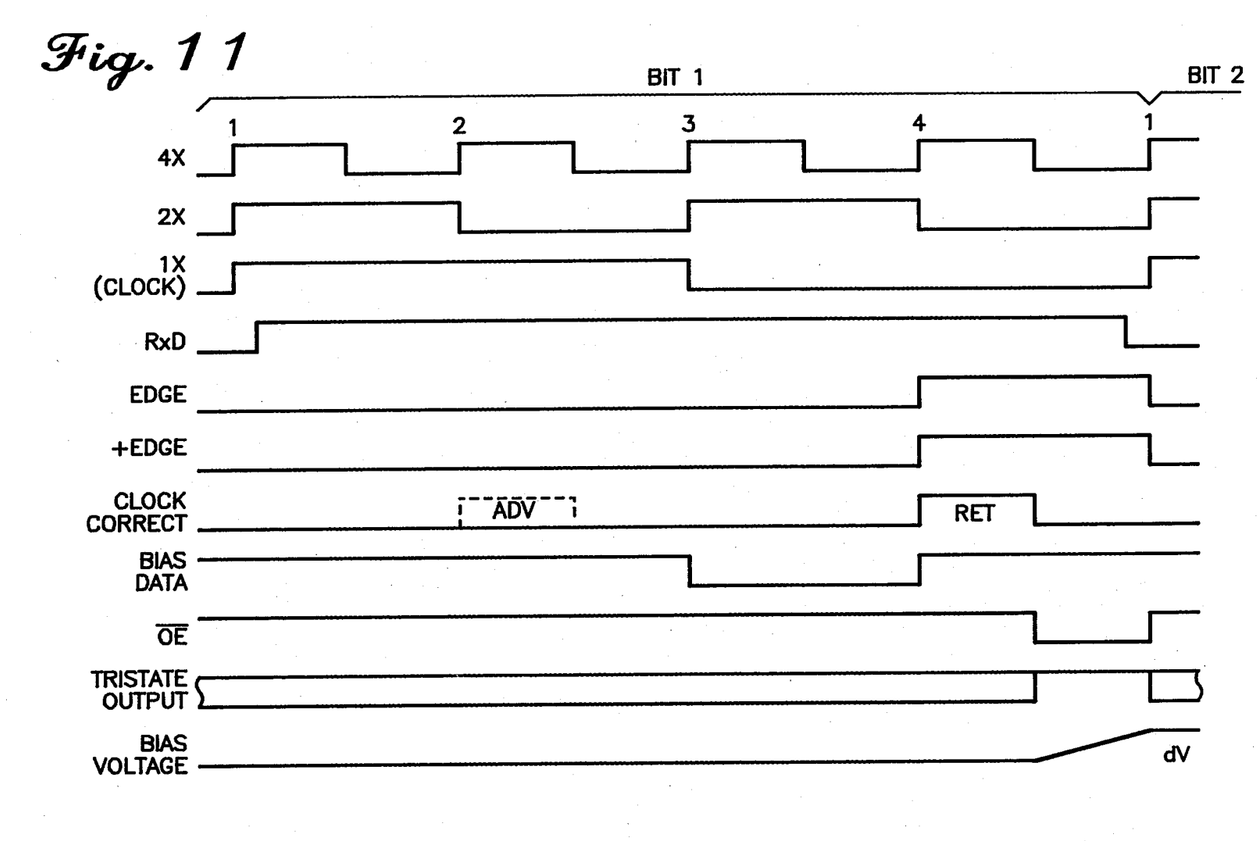
FIG. 11 is a logic signal timing diagram illustrating the timing of the various logic signals of the present invention when the limiter bias is improperly set.

The operation of the present invention can be further understood by considering its operation over the period of one data bit and observing the logic levels which occur during this one bit time. A timing diagram, shown in FIG. 11, illustrates a possible sequence of events resulting in the incremental positive voltage change in the bias voltage. The lines designated 4X, 2X, and 1X (clock) are derived by the automatic clock recovery circuit 702. As mentioned earlier, advance correction in the clock may occur when the 1X clock signal is high and retard corrections to the clock may occur when the 1X clock is low. A possible clock correction for the example in FIG. 11 is shown occuring in the clock correction line.

The received data line ($R_xD$) is shown as having a limiter bias voltage having been set too low. This condition causes the bit transistion of the $R_xD$ line to occur after the beginning of the first cycle of the 4X line. This occurrence causes the EDGE signal generated by data sampler 500 to go high at the beginning of the 4th cycle of the 4X line. Thus the $\overline{OE}$ line, in accordance with the logic of FIG. 10, goes low during the last half cycle of the 4th cycle of the 4X line. At that time, the inputs to NOR gate 1008 (the 4X line, the 2X line, the bias switch control and the inverted EDGE signal) are low. As described previously, the $\overline{OE}$ line causes transistor 1002 of FIG. 10 to conduct and cause the output of the tristate configuration of transistors 1002 and 1004 to go to $V_{DD}$ thereby causing capacitor 210 to begin to charge through resistor 1006. As shown in FIG. 11, the tristate output going high causes the limiter bias voltage to increase by the amount dV. In the preferred embodiment this incremental voltage equals approximately 6.5 millivolts.

In order to provide an even greater improvement in baseline wander bias tracking ability without increasing the average data transition jitter due to the incremental bias corrections, an edge history correction circuit may be included with the limiter and bias circuit described in FIG. 10. This feature is of particular importance when the baseline wander is a continuous drift in one direction (such as would be experienced when a substantial difference between transmit and receive frequency exists in an AC coupled system) and the data signal has few transitions (such as a long sequence of "1" or "0" data bits). In accordance with this feature of the present invention, the circuit shown in the schematic diagram of FIG. 12 generates an edge history dependent dV bias correction for each edge which is inversely proportional to the number of edges occuring in the last 15 bit times. If N bit edges occur within a period of T seconds, the maximum amount of bias voltage correction available to track the baseline wander over the period T is (N)(dV). Thus, dV can be increased as N decreases or decrease as N increases to achieve the same baseline wander tracking ability.

Figure 12:
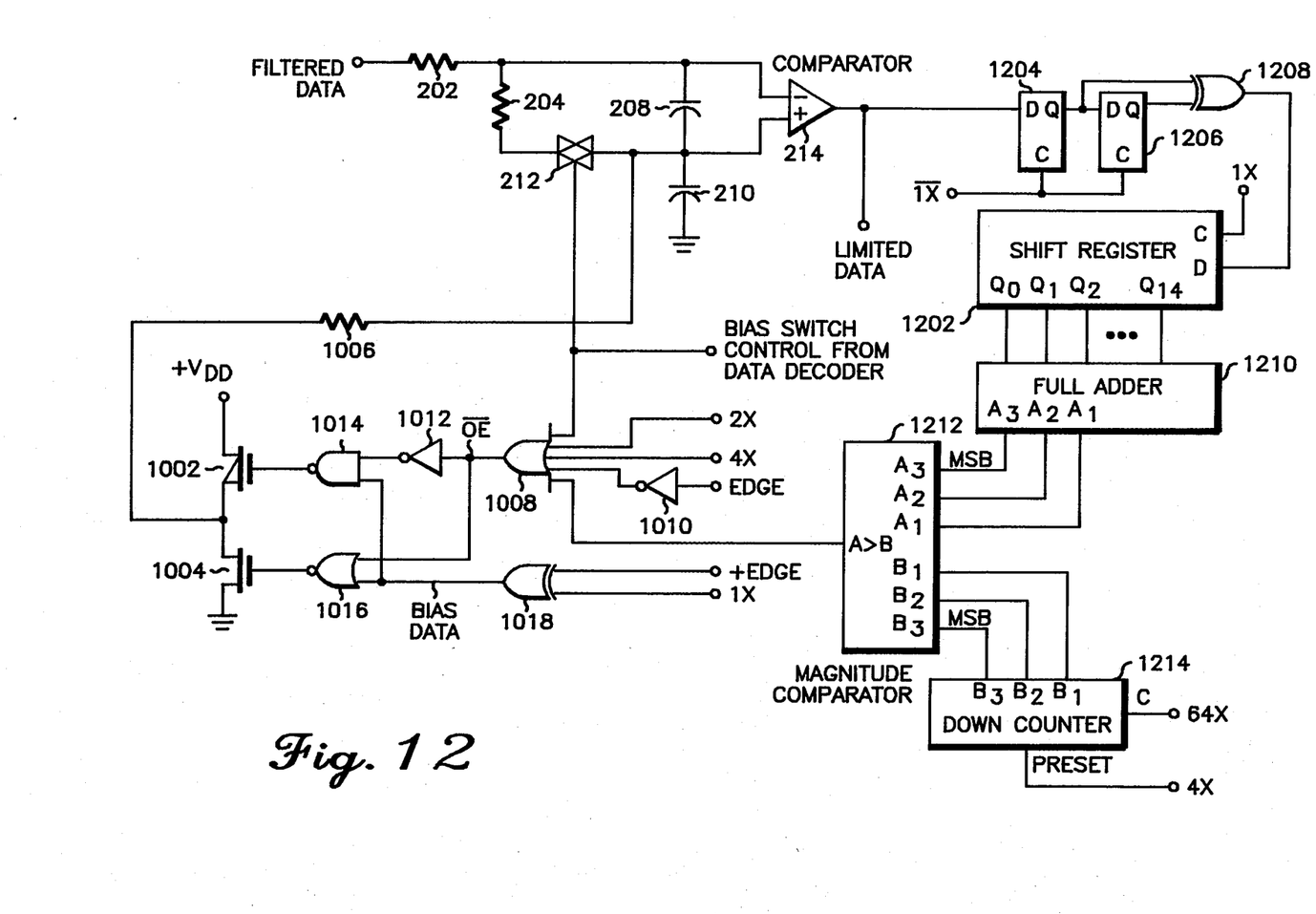
FIG. 12 is a schematic diagram of the limiter and bias correction circuit of the present invention further showing an edge history correction circuit.

The novel circuit of FIG. 12 includes a last 15 bit time data edge history register, which in the preferred embodiment is a conventional shift register 1202. Limited data is coupled from the output of comparator 214 through serial D-Q flip-flops 1204 and 1206 the outputs of which are coupled to Exclusive-OR gate 1208 which, in turn, is connected to the D input of shift register 1202. A full adder network 1210 (implemented in the preferred embodiment with three MC14008B 4-bit full adders manufactured by Motorola, Inc.) is coupled to the shift register 1202 outputs and is used to convert the number count of edges to a binary number. Only the three most significant bit positions of the binary number are required for adequate resolution in the preferred embodiment. This truncated binary number is supplied to a first input bus of a magnitude comparator 1212, which may be an MC14585B manufactured by Motorola, Inc. The other input bus of the magnitude comparator 1212 is supplied by a 3 bit down counter 1214 which, in the preferred embodiment, may be an MC14029B manufactured by Motorola, Inc. Down counter 1214 receives one input from the 64X local clock and the 4X clock from the automatic clock recovery circuit 702. The 3 bit down counter 1214 counts down with the 64X clock each time the 4X clock line goes low. The counter 1214 is preset to all ones while 4X is high.

The A>B output of the magnitude comparator 1212 is applied to OR gate 1008. Each time the 4X line goes low, the A>B output of the magnitude comparator 1212 remains low for a fraction of the time period 4X is low depending upon the edge count. This results in an edge count dependent $\overline{OE}$ pulse width. Since the $\overline{OE}$ pulse width determines the capacitor 212 charging or discharging time, the magnitude of the dV bias correction is also dependent on the edge count. For the case of 0 or 1 edge counts, the $\overline{OE}$ output remains low for the full period while the 4X signal is low and results in the maximum dV bias correction. For 14 or 15 edge counts, the $\overline{OE}$ output remains low only ⅛th of the period while the 4X line is low. This results in the minimum dV bias correction. The table in FIG. 13 shows the $\overline{OE}$ output pulse width and dV bias correction for all possible edge counts in the preferred embodiment employing a 5 volt supply ($V_{DD}$), a resistor 1006 having a value of 40K ohms, and other component values as described previously.

Thus, an automatic bias circuit for compensating the baseline wander of AC coupled synchronous baseband data communication systems has been shown and described. This circuit employs a fast recovery averaging baseline bias in the period before detection of word synchronization, and a bit tracking automatic baseline biasing circuit after word synchronization detection. This automatic bias circuit determines whether the bias is above or below the data true baseline and provides an additive or subtractive voltage increment for a period of time related to the bit rate. The voltage increment moves the baseline bias up or down by a predetermined amount at each data bit edge. Additionally, the duration of the voltage increment may be made dependent upon the history of the number of data edges which occur in a particular period of time. Thus, a larger or smaller bias changing incremental voltage may be generated. Therefore, while a particular embodiment of the invention has been described and shown, it should be understood that the invention is not limited thereto since many modifications may be made by those skilled in the art. It is therefore contemplated to cover by the present application any and all such modifications that fall within the true spirit and scope of the basic underline principles disclosed and claimed herein.

I claim:

1. An automatic bias control circuit for a synchronous data detector in which the baseline of a data signal input to the automatic bias control circuit is approximated by a bias level, said automatic bias control circuit comprising:
   means responsive to the input data signal and said bias level for producing binary data levels, and signals representing data level transition edges;
   means for generating local clock signals;
   means for detecting a time relationship between said level transition edge representative signals and at least one of said local clock signals; and
   means for modifying the bias level in accordance with said detected time relationship thereby causing said data level transition edges to be substantially synchronized with said local clock signals.

2. An automatic bias control circuit in accordance with claim 1 wherein said means for producing binary data levels and signals representing data level transition edges comprises a comparator.

3. An automatic bias control circuit in accordance with claim 2 wherein a capacitor is coupled to said means for modifying the bias level and a noninverting input of said comparator to store a reference bias level for said comparator.

4. An automatic bias control circuit in accordance with claim 1 wherein said means for generating local clock signals further comprises means for synchronizing said local clock signals to the input data.

5. An automatic bias control circuit in accordance with claim 1 wherein said means for generating local clock signals further comprises means for generating at least two clock signals at harmonically related frequencies.

6. An automatic bias control circuit in accordance with claim 1 wherein said means for detecting a time relationship further comprises means for effecting a logical OR function between at least one of said edge representative signals and at least one of said local clock signals.

7. An automatic bias control circuit in accordance with claim 1 further comprising means, coupled to said means for modifying the bias level, for determining whether said bias level should be increased or decreased.

8. An automatic bias control circuit in accordance with claim 1 further comprising:
means for detecting a predetermined binary pattern in the input data;
means for establishing the bias level dependent upon the average magnitude of the data signal during said detection of said predetermined binary pattern; and
means, responsive to said detection of said predetermined binary pattern, to disable said bias level establishing means.

9. A bias control circuit for a data signal limiter of a synchronous data decoder in a radio data communications system in which the baseline wander of the data signal is compensated by a variable bias level, comprising:
means for detecting a predetermined binary pattern in the data signal;
means for establishing a bias level magnitude dependent upon the average magnitude of the data signal;
means for disabling said bias level magnitude establishing means when said predetermined binary pattern is detected;
means responsive to said bias level magnitude for limiting the data signal to produce binary data levels, related to the data signals and to produce signals representing data level transition edges;
means for generating local clock signals synchronized with the data signal no later than the occurrence of said detection of said predetermined binary pattern;
means for detecting a time relationship between said level transition edge representative signals and at least one local clock signal; and
means for modifying said bias level magnitude incrementally in a positive direction each time said time relationship detection indicates a bias level less than the baseline and for modifying said bias level magnitude incrementally in a negative direction each time said time relationship detection indicates a bias level greater than the baseline.

10. A bias control circuit in accordance with claim 9 wherein said means for limiting comprises a comparator in which the data signal is applied to a first input port and the variable bias level is applied to a second input port.

11. A bias control circuit in accordance with claim 10 wherein a capacitor is coupled to said second input port to store said bias level magnitude.

12. A bias control circuit in accordance with claim 9 wherein said means for generating local clock signals further comprises means for generating at least two clock signals at harmonically related frequencies.

13. A bias control circuit in accordance with claim 9 wherein said means for detecting a time relationship further comprises means for effecting a logical OR function between at least one of said edge representative signals and at least one of said local clock signals.

14. A method of biasing a data signal limiter of a synchronous data decoder to compensate baseline wander of the data signal with a bias level, comprising the steps of:
producing binary data levels and signals representing data level transition edges in response to the data signal and said bias level;
generating local clock signals;
detecting a time relationship between said level transition edge representative signals and at least one of said local clock signals; and
modifying the bias level in accordance with said detected time relationship, thereby causing said data level transition edges to be substantially synchronized with said local clock signals.

15. A method in accordance with the method of claim 14 further comprising the steps of:
detecting a predetermined binary pattern in the data signal;
establishing a bias level dependent upon the average magnitude of the data signal; and
ceasing said bias level establishing step when said predetermined binary pattern is detected.

16. A method in accordance with the method of claim 15 further comprising the step of synchronizing said generated local clock signals to the data signal no later than the occurrance of said detection of said predetermined binary pattern.

17. A method in accordance with the method of claim 14 wherein the step of detecting a time relationship further comprises the step of effecting a logical OR function between at least one of said edge representative signals and at least one of said local clock signals.

18. A method in accordance with the method of claim 14 wherein the step of modifying the bias level further comprises the step of incrementally increasing the bias level when said time relationship detection indicates a bias level less than the baseline and incrementally decreasing the bias level when said time relationship detection indicates a bias level greater than the baseline.

* * * * *